United States Patent [19]

Hirakawa

[11] Patent Number: 4,505,485
[45] Date of Patent: Mar. 19, 1985

[54] ROTARY SEAL WITH LINEAR WEAR RESISTANT TREATED LAYER

[75] Inventor: Osamu Hirakawa, Saitama, Japan

[73] Assignee: Nippon Piston Ring Co., Ltd., Tokyo, Japan

[21] Appl. No.: 502,064

[22] Filed: Jun. 7, 1983

[30] Foreign Application Priority Data

Jun. 7, 1982 [JP] Japan .............................. 57-83490[U]

[51] Int. Cl.³ .......................... F16J 15/26; F16J 15/34
[52] U.S. Cl. .................................. 277/96.1; 277/96.2; 277/204; 277/224; 277/DIG. 6
[58] Field of Search .................. 277/1, 96, 96.1, 96.2, 277/134, 224, 203, 204, DIG. 6

[56] References Cited

U.S. PATENT DOCUMENTS

| | | | |
|---|---|---|---|
| 3,539,192 | 11/1970 | Prasse | 277/224 |
| 3,810,637 | 5/1974 | Bonvin | 277/96.2 |
| 3,814,447 | 6/1974 | Prasse et al. | 277/224 |
| 4,132,419 | 1/1979 | Sunami et al. | 277/96.2 |

FOREIGN PATENT DOCUMENTS

| | | | |
|---|---|---|---|
| 644840 | 7/1962 | Canada | 277/96.1 |
| 2060132 | 4/1981 | United Kingdom | 277/224 |

Primary Examiner—Robert S. Ward
Attorney, Agent, or Firm—Sughrue, Mion, Zinn, Macpeak and Seas

[57] ABSTRACT

A rotary seal improved in quality by providing relatively movable seal surfaces in the form of a hardened, wear resistant layer covering only a part of the seal body surface. In particular the hardened layer may be formed in a helical fashion such that upon relative rotation of the seal surfaces, entering abrasives and the like may be shunted to the outside periphery of the seal, per se.

8 Claims, 8 Drawing Figures

ROTARY SEAL WITH LINEAR WEAR RESISTANT TREATED LAYER

BACKGROUND OF THE INVENTION

This invention relates to sealing means for a rotating shaft, and more particularly to a rotary seal such as a floating seal or a mechanical seal, which is adapted to seal between two relatively rotatable surfaces.

A rotary seal means may comprise, for example, floating seals 5, 5 as shown in FIG. 1, one being arranged on a part of a casing 2 of a rotating shaft 1 but not rotatable, and the other being enclosed by a cover 3 rigidly mounted to the rotating shaft 1. Seal surfaces 6, 6 of the rotatary seal are adapted to rotatably and slidably move when urged by O-rings 4, 4 and springs.

Rotary seals, and especially floating seals used in construction machines or vehicles are subjected to contact with earth, sand, waste water and the like to thus involve severe abrasion. This is also the case with mechanical seals under critical conditions. For this reason, wear proofing is an important problem in rotary seals.

Rotary seals are not always sealed on a given seal surface due to the wobble and runout of the rotating shaft. More specifically, as shown in FIG. 1, the rotary seals 5, 5 are radially out of center when driven. Floating seals are likely to involve a disadvantage due to foreign matter such as particles which may result in abrasion. This is because the positions and contact angles of the seal surfaces 6, 6 vary to provide distorted or offset abrasion by the variation in the working points A and the working forces derived from the depression of the O-rings 4, 4 shown in FIG. 1, so that surface tolerance, that is, the air-tightness of the seal surfaces, may be deteriorated.

For resistance to abrasion in the seal surfaces, alloy cast iron or chilled castings, specifically, Cr-Mo alloy cast iron and white cast iron, have been employed since they normally retain high hardness and are excellent in surface strength. However, these wear resistant cast irons are less machinable by virture of their higher hardness and readily develop casting defects and involve low productivity since they are high alloy castings.

In view thereof, an attempt has been made to provide wear resistant surface treatment to only the seal surfaces which are in need of wear proofing to improve resistance to abrasion at the seal surface, machinability of the base metal, and productivity, but this attempt has failed to obtain a fruitful result. This is because a wear resistant surface treatment layer consisting of a surface coating formed by plating and spraying is susceptible of exfoliation and rupture when foreign matter such as particles are interposed therein. On the other hand, wear resistance treatments involving heat hardening treatments such as boronization and iron nitriding involve difficulties in obtaining a highly hardened layer of sufficient depth and the product often lacks wear resistance. Further, it is impossible with a small-sized product such as a rotary seal to prevent the base metal from being deformed and distorted with heat hardening treatments.

In recent years, surface re-melting techniques have come into the limelight as surface wear resistance treatments. High density energy, specifically, a laser beam, an electron beam, a plasma arc, a TIG arc or the like, each having a thermal convergency of more than $10^4$ W/cm$^2$, is employed to quickly re-melt and cool the surface, to thus obtain a wear resistant structure of extremely high hardness and density. The addition of an alloyed element when remelting brings the capability of forming a deposited alloy layer, so that the wear resistance treatment can obtain products of higher hardness, strength and wear resistance.

The above notwithstanding, the surface re-melting technique limits the base metal to be re-melted as to species. A wider seal surface, as in rotary seals, requires a higher treated area ratio to total product volume. As a result, thermal effects on the rotary seal are not to be disregarded, and involve difficulties in practical use. Distorted or deformed abrasion derived from runout or eccentricity of the rotary seal in itself, as discussed above, is not prevented whatever the wear resistant surface obtained, so that this surface is inevitably subjected to abrasions inherent in the mechanism of the rotary seal.

SUMMARY OF THE INVENTION

The present invention is intended to improve the seal material and seal surface configuration in order to resist abrasion at the seal surfaces of the rotary seal; to prevent the seal surfaces from wearing due to a multiplied effect of the aforementioned defects; and in principle to maintain machinability and improve productivity of the base metal by performing a wear resistance treatment on the seal surfaces.

The present invention provides a rotary seal which is characterized as follows:

(1) The seal surface includes a wear resistant treated layer present thereon.

(2) The wear resistant treated layer is in a linear form.

(3) The linear wear resistant treated layer is directed obliquely to the circumferential direction of the rotary seal.

DETAILED DESCRIPTION OF THE PREFERRED EMBODIMENTS

The present invention, as above summarized, will now be explained, by reference to the following description of an embodiment thereof.

Figure 1:
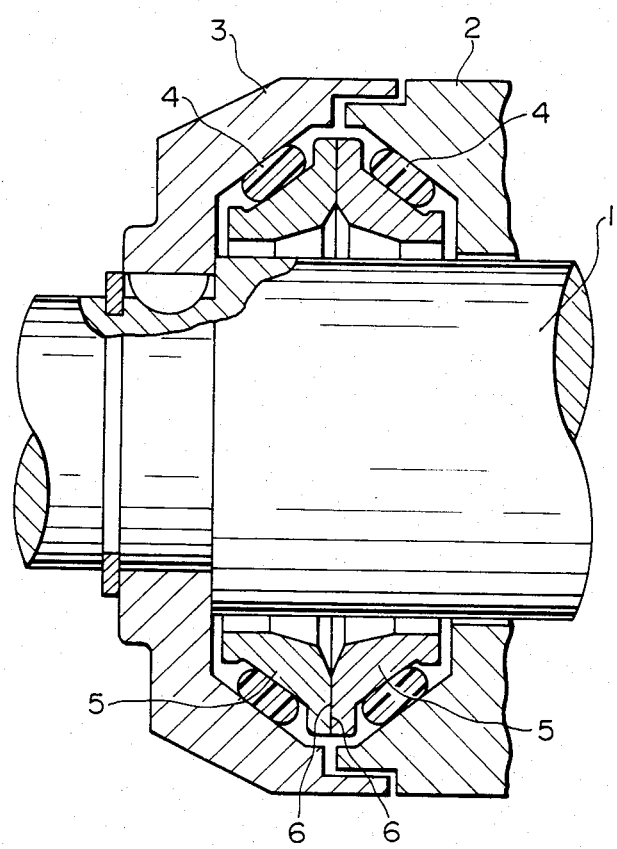
FIG. 1 is a sectional view showing the manner in which a rotary seal is used.
Figure 2:
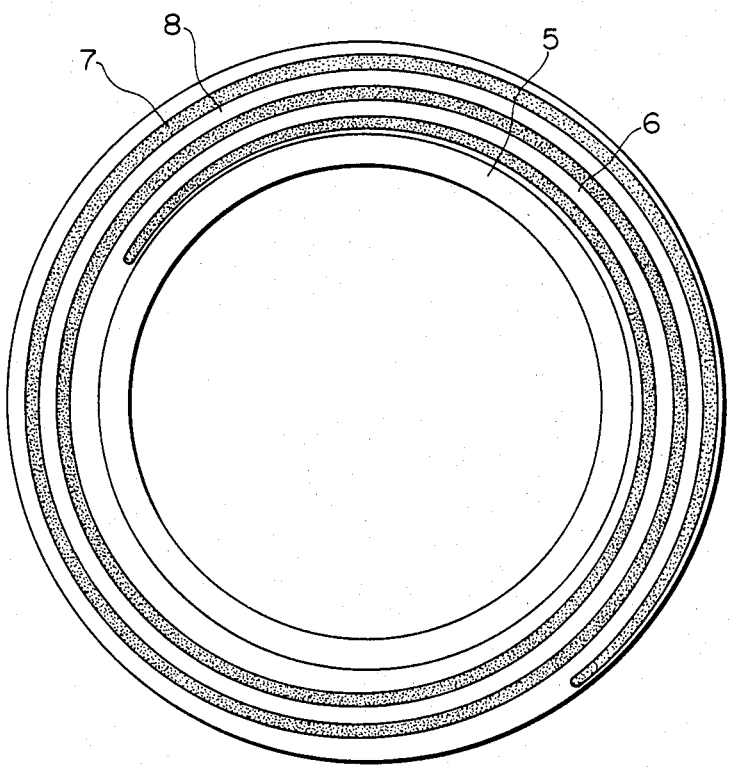
FIG. 2 is a front view of a first embodiment of a rotary seal of the present invention.
Figure 3:
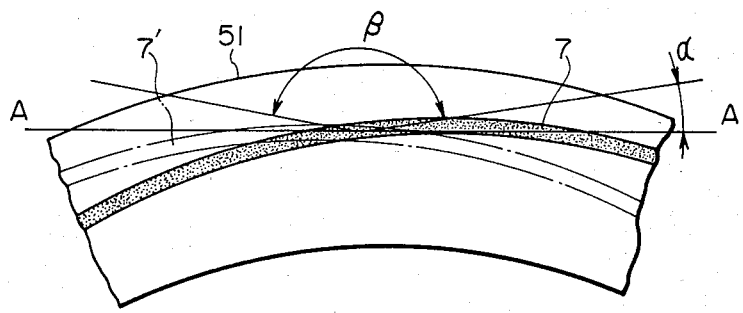
FIG. 3 is a front view of a substantial part of the rotary seal of the present invention, which is explanatory of the operation of the rotary seal.

FIG. 2 is a front view of a rotary seal illustrating one embodiment. Referring to FIG. 2, a rotary seal 5 is provided at a seal surface 6 with a wear resistant treated layer 7 of helical form. By the provision of the helical wear resisting treated layer, the wear proofing is improved as explained hereinafter. The treated layer 7 is of extremely higher hardness and superior wear proofing as compared with the exposed surface 8 of the base metal and is of helical form, having an incline angle $\alpha$ with respect to the circumferential tangential direction A—A of the rotary seal, as shown in FIG. 3. A pair of rotary seals, each having the helical treated layer, are combined with one another to form a crossing angle β of 180°-2α defined by the two helical treated layers 7, 7', as shown in FIG. 3. Thereupon, when the pair of rotary seals relatively rotate with the direction of the seal indicated by the solid line rotating in the counterclockwise direction, a line connecting the helical treated layers 7, 7' is displaced to the periphery 51, thus functioning to eliminate or remove foreign matter such as earth, sand, and waste water penetrating in from the side. This removal mechanism may be temporarily obtained by providing a helical groove or projection, but functional deterioration is likely as it wears out and becomes of no use. According to the present invention, the wear resisting layer is provided in helical form to maintain the function of foreign matter removal for a long period of time.

Figure 4:
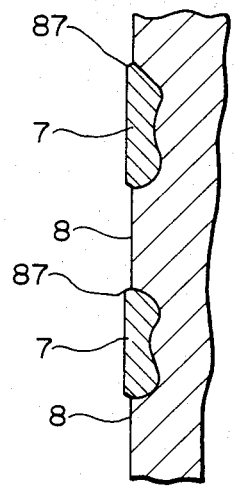
FIGS. 4 and 7 are fragmentary sections of other embodiments of the present invention.

More specifically, in accordance with the present invention, a frictionally stepped portion is generated because of the abrasion wear differential between the helical wear resistant treated layer 7 and the exposed surface 8 of the base metal as wear progresses, as seen from FIG. 4. In this connection, the exposed surface 8 of the base metal contributes to an effect of lubrication oil retainability for the rotary seal surface and also functions to remove foreign matter particles on the helical wear resistant treated layer. During the period of time when the frictionally stepped portion is being generated, that is, when the rotary seal is worn at an early stage, there is an advantage of quick break-in. Upon the termination of initial break-in abrasion, the helical wear resistant treated layer of superior wear proofing forms a sliding surface to minimize the development of wear, thereby maintaining a stable wear proof surface for a long period of time.

Figure 5:
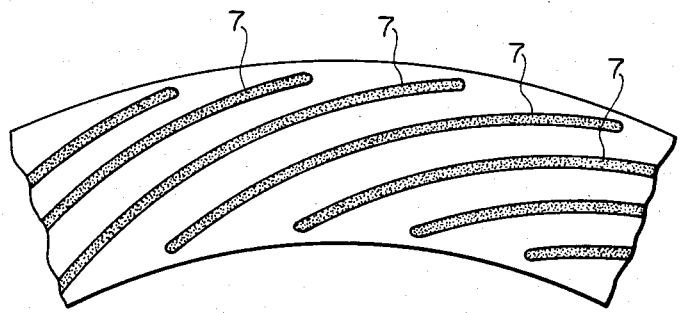
FIGS. 5 and 6 and 8 are fragmentary front views of further embodiments of the present invention.
Figure 6:
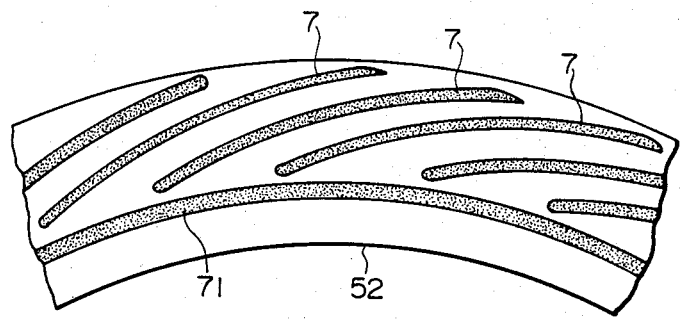

The instant rotary seal, which performs the functions of foreign particle removal and of holding lubricant may be obtained in any manner such that the treated layer is provided at an inclined angle with the circumferential tangential direction of the rotary seal. For instance, the same effect may be obtained even if a plurality of the treated layers 7, 7 are provided as shown in FIG. 5.

In the present invention, the difference in levels of the exposed surface of the base metal and the wear resistant treated layer is normally on the order of 5-5μ, and the lubricant between the rotary seal surfaces is adherent to the seal surfaces and not removed therefrom. When the inner lubricant is discharged to the outer periphery of the rotary seal, an annular wear resistant treated layer 71 may be formed at the inner peripheral side 52 or the outer peripheral side thereof to prevent the lubricant from scattering.

Figure 7:
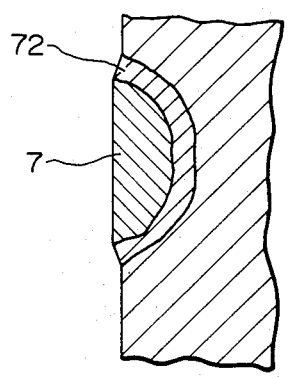

As set forth hereinabove, wear proofing is essential to the wear resistant treated layer. It is, however, most desirable for the layer to be a hardened layer obtained by re-melting and cooling the surface, or a hardened layer deposited and alloyed by re-melting the surface. This is because the rotary seal is required to have excellent wear proofing characteristics, so a wear resistance treatment should be made so as to provide high hardness and eminent surface strength. A mere coating is too weak in strength, particularly exfoliation strength, to attain the aforementioned end and is inclined to lack hardness and strength under thermal hardening treatments such as boronizing an iron nitrification. In contrast, a surface re-melting hardening treatment may fully avoid the danger of exfoliation from the base metal and yields a product of remarkably high hardness, density, and superior surface strength ascompared with conventional treatments. In the present invention, the selective production of wear resistant treated layers may be put to practical uses not enjoyed by other treatments such as plating, spraying, and thermal hardening treatments. These other treatments require complicated processes such as masking or channelling when put to practical use. On the other hand, the re-melting treatment produces a heat-effected layer 72 peripherally of the re-melting treated layer 7 as shown in FIG. 7, to provide higher hardness in proportion to the portion as hardened. The present invention, which makes use of the difference in abrasion amount, serves to heighten its effect.

More particularly, an edge 87 (FIG. 4) formed at the boundary between the wear treated layer 7 and the exposed surface of the base metal 8 as shown in FIG. 4 is likely to scratch an opposing sliding member and break off. However, in the present invention, since the thermally-effected layer whose hardness is substantially similar to that of the layer 7 is provided adjacent to the latter, acute edge generation can be obviated.

The hardening treatment based on re-melting and cooling is adapted to act as a treatment making cast iron into white cast iron when cast iron is used as the base metal, and functions as a treatment making steel into martensite by recrystallization and densifying steel when the latter is used as the base metal. In applications with elements which make alloys of Al-Cr, Al-W, Al-Co, Al-Ti, etc. or carbides and nitrides thereof, the metals to be so alloyed are disposed on the surface to be re-melted by plating, spraying, or painting, and the surface is re-melted to form a deposited alloyed layer thereon. This deposited alloyed layer is of remarkably high density and excellent strength as compared with the soft material such as aluminum or the like base metal. It is also possible to apply this molten alloying method to the surface of metals of iron materials such as steel, cast iron and the like. This method may also be readily applied to sintered metal base metals which involve difficulty in heat treatment and surface coating.

Figure 8:
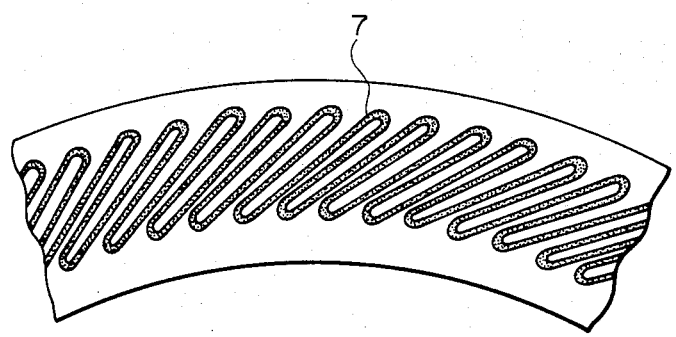

For the re-melting means, heat sources normally having a heat convergency of more than $10^4$ W/cm$^2$, specifically, a laser beam, an electron beam, a plasma arc, a TIG arc and the like may be employed when iron material is used as the base metal. When treatment is performed in the helical form as in the embodiment shown in FIG. 2, a heating beam or arc is radially moved while rotating the rotary seal. For the purpose of preventing the occurrence of blow-holes and cracks, the electron beam or the like may be used while vibrating the heating beam with the direction of the amplitude of the heating beam inclined toward the circumferential tangential direction of the rotary seal, so that a corrugated wear resistant treated layer is formed as shown in FIG. 8.

According to to the present invention, there is a remarkable difference in hardness between the exposed layer of the base metal surface and the wear resistant treated layer to involve a large difference in wear amount. A heat hardening treatment, that is, surface quenching and soft nitriding may preferably be applied to the whole seal surface to reduce the difference in hardness between it and the wear resistant treated layer.

In order to provide a practical rotary seal, alloy cast iron having wear proofing to a certain extent, that is, Cr-Mo or Mo-Ni-Cr flake or sphreroidal graphite cast iron, tool steel or Al-Si alloy, are suitable as the base metal.

When using additional elements in a deposited alloy application, carbide forming elements such as Cr, W, V, Ti, Nb, Co, and Mo are mixed with a carbide or C and then added thereto.

The present invention is designed so that the area to be treated is small as compared to treatment of the whole rotary seal surface, to lessen the heat effect derived from the re-melting treatment. This facilitates the re-melting treatment of an article of small diameter, such as a rotary seal.

As set forth above, the present invention contemplates the formation of a wear resistant treated layer on the rotary seal surface obliquely of the circumferential tangential direction thereof to afford higher wear proofing by the multiplied effect of the wear proofing effect in the material aspect, and a further wear proofing effect derived from the configuration. In addition, the machinability and productivity of the base metal are maintained.

The present invention has been described with respect to an embodiment such as a floating seal which is designed to deal with the penetration of foreign matter from its periphery. When the embodiment is used in shaft sealing means for a refrigerating compressor or a hot gas engine, the rotary seal is rotated in the direction of the orientation of the wear resistant treated layer (clockwise in FIG. 3) to provide higher airtightness at the inner periphery. The direction of the rotary seal may be selected according to the application thereof.

In the present invention, two such rotary seals may be used in combination to improve the effect. However, the same effect may be attained using one conventional rotary seal in planar form, and one rotary seal according to the present invention. Further, the dimensions and the incline angle may be properly selected according to the speed and diameter of the rotating shaft and the extent of required wear proofing.

Although the present invention is described such that the surface re-melted hardened layer or deposite alloy layer is used for the rotary seal, laser or a electron beam quenching and a spraying layer of wear resistant materials usch as Mo, a self-molten alloy, carbide and the like may be provided for a relatively light load rotary seal.

What is claimed is:

1. A rotary seal for sealing between two relatively rotatable surfaces, comprising; at least one rotary seal surface having a wear resistant treated layer, said wear resistant treated layer formed on the rotary seal surface being of a linear form, said linear wear resistant treated layer being formed obliquely with respect to the circumferential direction of said seal surface.

2. A rotary seal as claimed in claim 1, wherein said wear resistant treated layer is a hardened layer formed by surface re-melting and cooling.

3. A rotary seal as claimed in claim 1, wherein said treated layer comprises deposit alloyed, hardened layer.

4. A rotary seal as claimed in claim 1, wherein said linear treated layer on the rotary seal is in the form of helix.

5. A rotary seal as claimed in claim 1, wherein said linear treated layer is continuous.

6. A rotary seal as claimed in claim 1, wherein said linear treated layer comprises a plurality of discontinuous curvilinear portions each arranged obliquely with respect to said circumferential direction.

7. A rotary seal as claimed in claim 6, and further including a circular treated layer arranged proximate end portions of said curvilinear portions.

8. A rotary seal as claimed in claim 5, wherein said linear treated layer comprises a sinuous layer having a predetermined amplitude, and oscillating primarily in a direction oblique to said circumferential direction.

* * * * *